United States Patent [19]

Heninger et al.

[11] Patent Number: 5,414,854
[45] Date of Patent: May 9, 1995

[54] OBJECT-ORIENTAL SYSTEM FOR MANAGING SHARED LIBRARIES

[75] Inventors: Andrew G. Heninger, Los Altos; Russell T. Nakano, Sunnyvale, both of Calif.

[73] Assignee: Taligent, Inc., Cupertino, Calif.

[21] Appl. No.: 42,959

[22] Filed: Apr. 5, 1993

[51] Int. Cl.⁶ .............................................. G06F 9/445
[52] U.S. Cl. .................................. 395/700; 395/650; 364/DIG. 1; 364/280.2
[58] Field of Search .......................... 395/600, 650, 700

[56] References Cited

U.S. PATENT DOCUMENTS 5,247,679  9/1993  Kumar ................................. 395/700
5,274,819 12/1993  Blomfield-Brown ............... 395/700

FOREIGN PATENT DOCUMENTS 0352447  1/1990  European Pat. Off. .

OTHER PUBLICATIONS

Bridge, A., "RTL Routine Finds Symbols and More", Digital Review, vol. 5, Issue No. 4, 1988.

Programmer's Journal, vol. 7, No. 2, Apr. 1989, pp. 40–47, R. Duncan "OS/2 Dynamic Link Libraries".

Primary Examiner—Thoams G. Black
Assistant Examiner—John C. Loomis
Attorney, Agent, or Firm—Keith Stephens

[57] ABSTRACT

A method and apparatus is disclosed for locating and loading shared libraries linked with a given shared library that has been launched by a program. The present invention operates by initially determining the names of the shared library names that are necessary to a program that has been launched. Thereafter, search objects are employed to search for and attain the physical shared library locations that correspond to the determined names. A collection of search objects can be placed within a team and employed in a selected sequential order. Upon the attainment of an appropriate locations corresponding to each of the shared library names, each of the shared library names are mapped to its corresponding physical location. Thereafter, the contents of each physical shared library location can be loaded for purposes of a program.

28 Claims, 5 Drawing Sheets

OBJECT-ORIENTAL SYSTEM FOR MANAGING SHARED LIBRARIES

CROSS-REFERENCE TO RELATED PATENT APPLICATIONS

This application is related to the following U.S. patent applications: (i) the application entitled "Object Oriented Framework System," by Debra L. Orton, David B. Goldsmith, Christopher P. Moeller, and Andrew G. Heninger, filed Dec. 23, 1992, and assigned to Taligent, Inc., the disclosure of which is hereby incorporated by reference; and (ii) the application entitled "Object Oriented Operating System," by Robert Dickinson, filed Jan. 22, 1993, and assigned to Taligent, Inc., the disclosure of which is hereby incorporated by reference.

1. Field of the Invention

This invention generally relates to the loading of shared libraries and more particularly, to the mapping of shared library names with physical shared library locations by the employment of search objects.

2. Background of the Invention

A library represents a collection of data and code stored at a certain location. A library maintains older data items as well as receives new data items. Thus, the number of data items can constantly increase. In addition, existing data items are dynamic and subject to change. Multiple versions of a library may also exist in a computer system.

A library may also be shared. That is, a library may be used concurrently by several applications or processes. Such a library is referred to as a "shared library".

When an application or program is launched, it is necessary to "load" all shared libraries that are necessary to implement the program. A program generally refers to the name of a shared library. Consequently, the shared library referred to within the program, as well as all other shared libraries it depends upon, must be located before loading can occur.

Current computer systems are unable to effectively ascertain the locations of requisite shared libraries from the name referred to by a program. This follows since current computer systems are unable to undertake complex searches for shared library locations. Furthermore, current computer systems are unable to distinguish between versions and copies of shared libraries. Still further, current computer systems are unable to appropriately compensate for the compatibility attributes of different shared libraries. Thus, the prior art that the applicant is aware of provides a system that is insufficiently complex and effective for loading shared libraries.

SUMMARY OF THE INVENTION

The present invention overcomes the aforementioned deficiencies of the prior art by providing a method and apparatus that effectively searches for and locates physical shared library locations from shared library names.

The present invention operates by initially determining the names of the shared libraries that are necessary to a program that has been launched. Thereafter, search objects are employed to search for and locate a physical location corresponding to each of the determined names. Multiple search objects can also be formulated within a team. A team refers to an address space and a plurality of threads of execution executing within the address space. This allows for physical locations to be located by employing a collection of search objects in a selected sequential order. For instance, search objects can be consecutively employed in the order in which they were added to the team.

Once the search objects attains an appropriate physical location corresponding to each of the shared library names, each of the shared library names is mapped to its corresponding physical location. Thereafter, the contents of the attained physical shared library locations can be loaded for purposes of the program.

BRIEF DESCRIPTION OF THE DRAWINGS

The foregoing and other aspects and advantages of the present invention will be better understood from the following detailed description of the preferred embodiment of the invention with reference to the accompanying drawings, in which.

DETAILED DESCRIPTION OF THE PREFERRED EMBODIMENT OF THE PRESENT INVENTION

Computer System

Figure 1:
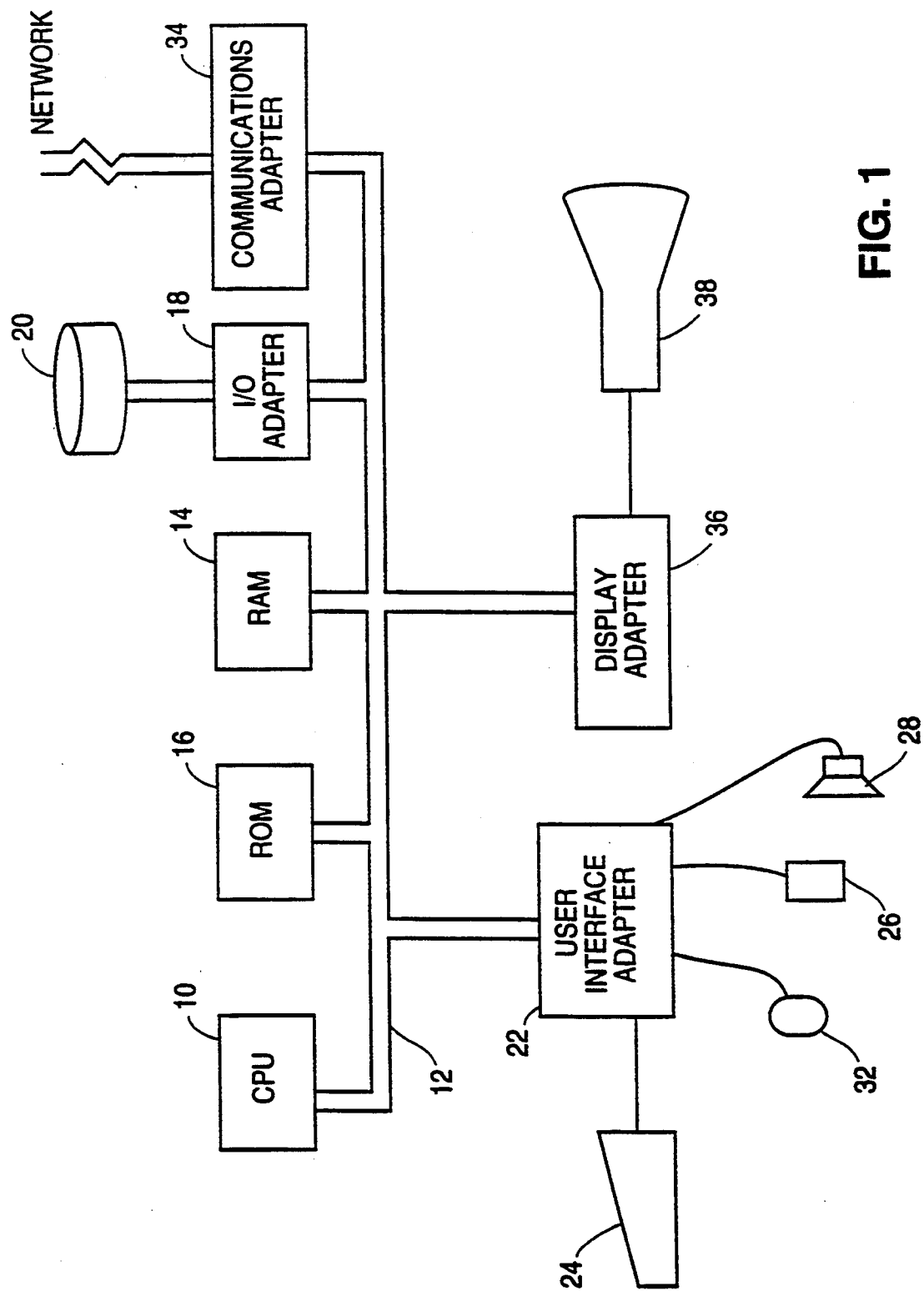
FIG. 1 is a block diagram of a computer system in accordance with the present invention.

A representative hardware environment is depicted in FIG. 1, which illustrates a suitable hardware configuration of a workstation 40 in accordance with the present invention. The workstation 40 has a central processing unit 10, such as a conventional microprocessor, and a number of other units interconnected via a system bus 12. The illustrated workstation 40 shown in FIG. 1 includes a Random Access Memory 14 (RAM), a Read Only Memory 16 (ROM), an I/O adapter 18 for connecting peripheral devices such as disk units to the bus 12, a user interface adapter 22 for connecting a keyboard 24, a mouse 26, a speaker 28, a microphone 32, and/or other user interface devices such as a touch screen device (not shown) to the bus 12. The workstation 40 may also have a communications adapter 34 for connecting the workstation 40 to a data processing network 30 and a display adapter 36 connecting the bus 12 to a display device 38.

The present invention preferably operates within an object oriented operating system as described by U.S. patent applications entitled "Object Oriented Framework System," filed Dec. 23, 1992, and "Object Oriented Operating System," filed Jan. 22, 1993. Both such patent applications having been assigned to Taligent, Inc.

LOGIC OPERATION OF THE PRESENT INVENTION

The present invention comprises a framework, to be used in conjunction with a computer system at run time of a program, for loading and linking shared libraries with one another. Such framework provides a manner by which a shared library name, as referred to by a program, is linked with the shared libraries from which it depends upon the launching of the program.

Every shared library is identified by a specified name and is located within a designated name space. A shared library is dependent upon, or necessarily linked with, any number of other shared libraries. A shared library load module, corresponding to a particular shared library, stores: (i) the specified name of a particular shared library; and (ii) the specified names of shared libraries from which the particular shared library depends.

Whenever a particular shared library is loaded pursuant to a program, all shared libraries which the particular shared library depends upon must also be loaded. Accordingly, a shared library load module is resorted to in order to ascertain the names of shared libraries to be loaded pursuant to a program. Since the shared library name space is global, each shared library should be given an uncommon name in order to insure that the appropriate shared libraries are linked together. The present invention operates upon the premise that each shared library has such a unique name.

For a program to execute upon launching, a shared library must be linked with other shared libraries. This linking process takes place once the appropriate shared libraries are loaded.

A mechanism, referred to as a loader, initially determines the names of the shared libraries that must be loaded. The loader must thereafter be advised of the physical shared libraries which correspond to the determined shared library names. Locations of physical shared libraries typically include a computer disk, RAM ("random access memory") and ROM ("read only memory"). The loader does not, however, determine where the libraries are located. Instead, the loader uses search objects to determine the location of shared libraries. Search objects map library names to physical shared library locations. The resulting mapping information then enables the loader to load the appropriate shared libraries.

Figure 2:
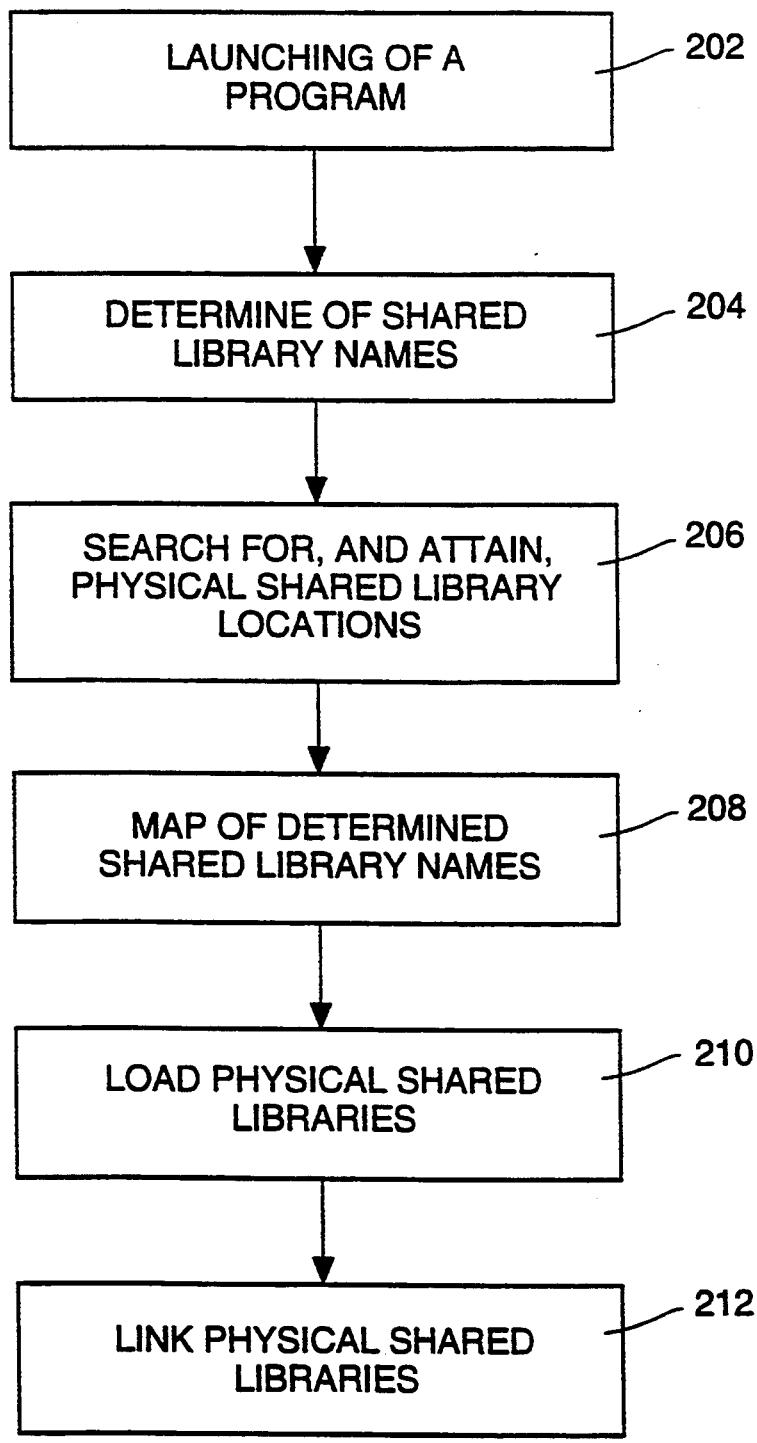
FIG. 2 illustrates a flow chart depicting the logic flow in accordance with the present invention.

Referring to FIG. 2, a flow chart describing the steps of linking one shared library with another is illustrated. The launching of a program typically requires shared libraries to be loaded and linked with one another. This is indicated by box 202. Thereafter, a determination is made of the names of shared libraries that are necessary to the launched program. This is indicated by box 204. Shared library names that are necessary to a program include those names referred to by a program as well as shared libraries from which the launched program or referenced shared library are dependent upon. Such names are ascertained from the aforementioned shared library load module.

Once the names of the shared libraries are ascertained, search objects are employed to locate the corresponding physical shared library locations that correspond to the names. This is indicated by box 206. Class TLibrarySearcher, as further described below, is a derived class that defines the interface for employed search objects. Given the ascertained names of the shared libraries, a search object attains the physical shared libraries by following the search instructions of the search object.

Attainment of the corresponding physical shared library locations results in mapping as indicated by box 208. Mapping involves designating the shared library names with the attained physical shared library locations. Thereafter, the attained physical shared libraries are loaded and linked with one another. This is indicated by reference numerals 210 and 212, respectively.

Search Objects

Object-orientation is a system technique that consists of a number of objects. Each object, which typically corresponds to a real life entity, offers a number of operations and a state which remembers the state of those operations. For instance, a person object would possess information corresponding to a person such as age, address, telephone number, occupation and so on. Operations are then created to access or affect this information. In addition, operations can be created to perform behavior that does not affect any internal information such as walking.

A class is a definition, a template or a mold to enable the creation of new objects. A class is thus a description of the common characteristics of several objects. The objects comprising a certain class have this template in common. The characteristics of a class may be inherited into a further class referred to as a subclass. A subclass thus inherits the information structure and behavior of a class. Further information and behavior may then be added to the subclass.

Classes lying below a class in the inheritance hierarchy are called descendants of the class. Classes lying above are called ancestors. The usage of the terms descendants and subclasses is thus interchangeable.

Figure 3:
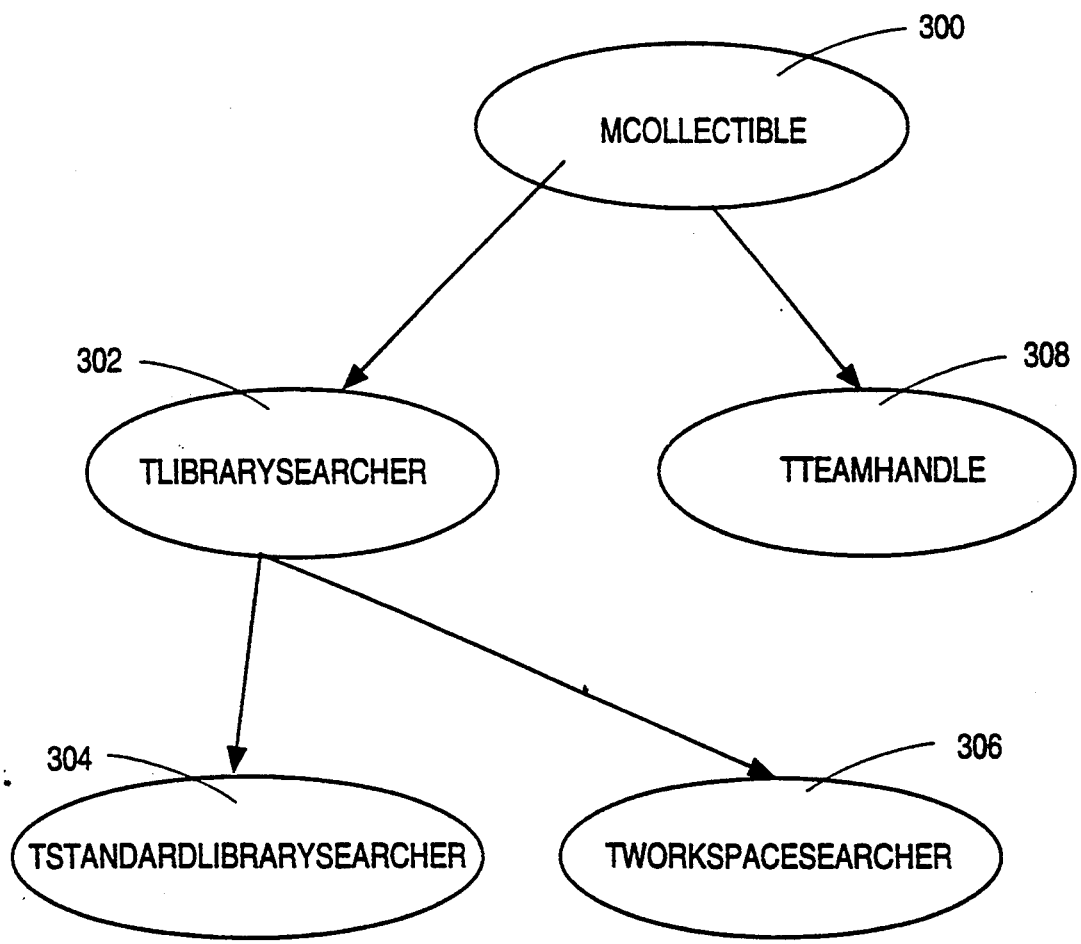
FIG. 3 illustrates a class inheritance hierarchy for search objects in accordance with the present invention.

Referring to FIG. 3, a hierarchy of search object classes is illustrated. Class MCollectible 300 represents the base class of all search objects. That is, class MCollectible 300 is the class from which all other classes descend from. The two primary descendants of class MCollectible 300 are class TLibrarySearcher 302 and class TTeamHandle 308. Class TLibrarySearcher 302 has two further descendants, class TStandardLibrarySearcher and class TWorkspaceSearcher, as indicated by reference numerals 304 and 306, respectively.

Class TStandardLibrarySearcher 304 defines a default search object which searches for physical shared libraries in a single directory. Since more than one directory is usually necessary to be searched, class TStandardLibrarySearcher 304 is typically incapable of locating all physical shared libraries in a system. Further, class TStandardLibrarySearcher 304 objects do not consider compatibility when faced with multiple copies of a library.

Accordingly, class TWorkspaceSearcher 306 is provided to locate physical shared libraries in lieu of a search object created pursuant to class TStandardLibrarySearcher 304. Class TWorkspaceSearcher 306 permits search objects to be formed from a workstation. Search objects, defined by class TWorkspaceSearcher 306, are capable of searching in more than one directory and are also capable of considering compatibility when necessary.

Objects derived from class TLibrarySearcher 302 can implement an arbitrarily complex search. For instance, such objects can: (i) consult file attributes; (ii) maintain a dictionary or database of libraries; and, (iii) interact with library installation procedures. A subclass of TLibrarySearcher 302, namely class TStandardLibrarySearcher 304 and class TWorkspaceSearcher 306, may also be created so as to check with the system if some version of a shared library is already in use.

Figure 4:
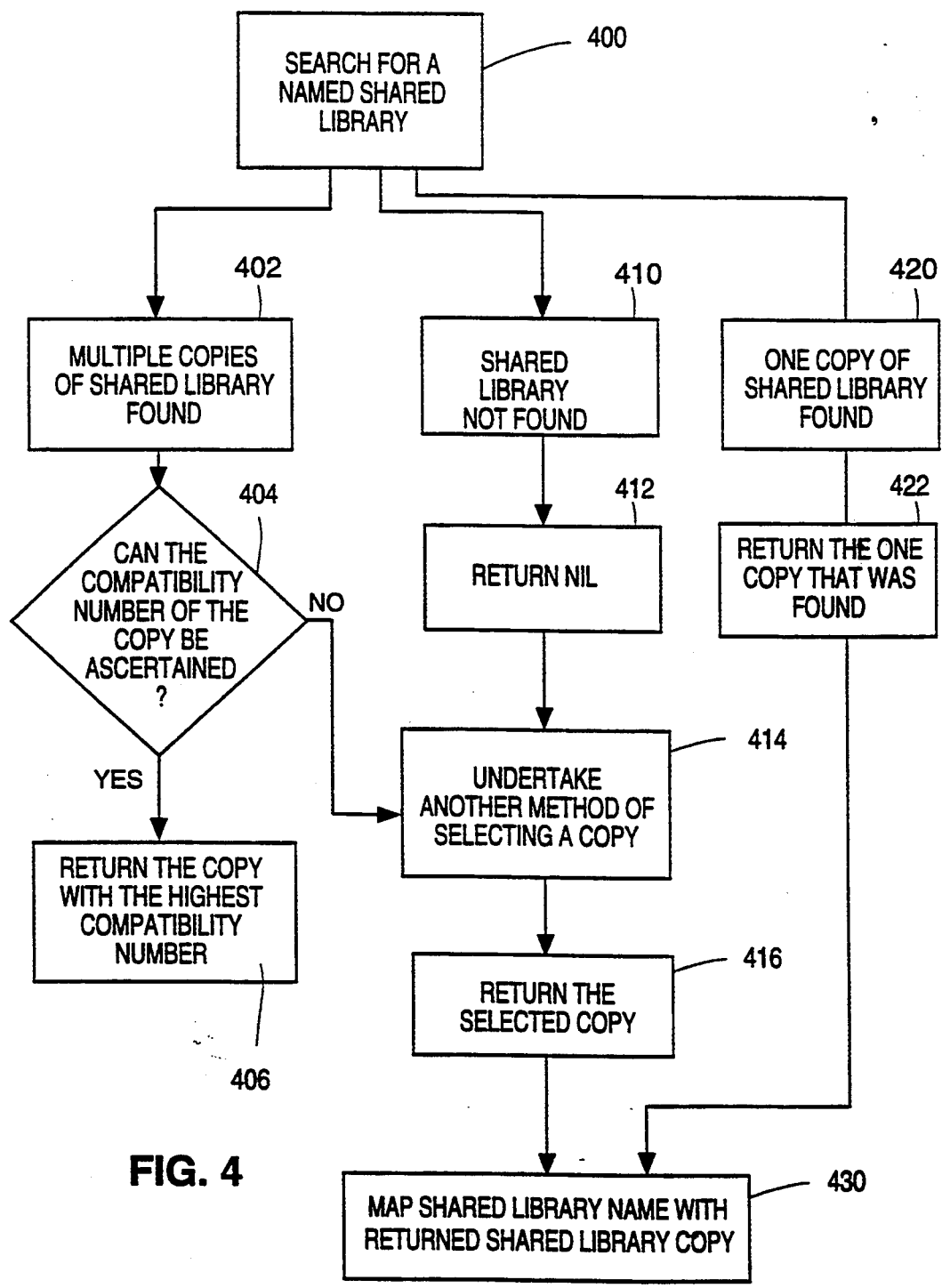
FIG. 4 illustrates a flow chart depicting the search for a named shared library, as followed by a search object, in accordance with the present invention.

Referring to FIG. 4, a flow chart depicting the logic flow of a search for a shared library is illustrated. Initially, a search object is presented with the name of a shared library. From this named shared library that is presented, a search for the location of the shared library is undertaken. This is indicated by reference numeral 400.

A search for the named library will reveal either: (i) multiple copies of the shared libraries; (ii) no location that corresponds to the shared library name; or (iii) one copy of the shared library. These outcomes are indicated by boxes having reference numerals 402, 410, and 420, respectively.

If a shared library is not found, the search object will return "NIL" as indicated by box 412. If only one copy of the shared library is found, that shared library will be returned to the loader as indicated by box 422.

If multiple copies of the shared library are found, however, further analysis is necessary before a copy can be returned. Such further analysis originally commences with a determination of whether the compatibility numbers of the shared library copies can be ascertained. This is indicated by box 404. If the compatibility numbers of the shared library copies can be ascertained, the shared library copy with the highest compatibility number will then be returned. This is indicated by box 406.

If the compatibility number of the shared library copies cannot be ascertained, a further method of selection is necessary. Such further method of selection can include a determination of whether any copies of the shared library are currently loaded elsewhere. Ultimately, the further method should return a selected copy of the shared library as indicated by box 416.

Returned copies of shared libraries, as denoted by boxes 406, 416, and 422, are mapped with the shared library name. This is indicated by box 430. Thereafter, the mapped information is disclosed to the loader.

Compatibility is a file system property of shared libraries which are files. Compatibility is measured by a compatibility number wherein a copy of a shared library with the highest compatibility number is likely to be compatible with other dependent shared libraries. Accordingly, a search object returns the copy of a shared library with the highest compatibility number. A search object is always able to do so when a shared library is a file since files always permit access to compatibility numbers. Shared libraries that are not files, however, may not allow access to the compatibility number of a copy. In such a case, the search object will not be able to ascertain the copy with the highest degree of compatibility.

Shared libraries are consecutively loaded where two conditions are met. First, a search object returns the copy with the highest compatibility number. Second, if among the locations where a search object has searched, a consistent set of shared libraries exist that will load.

Figure 5:
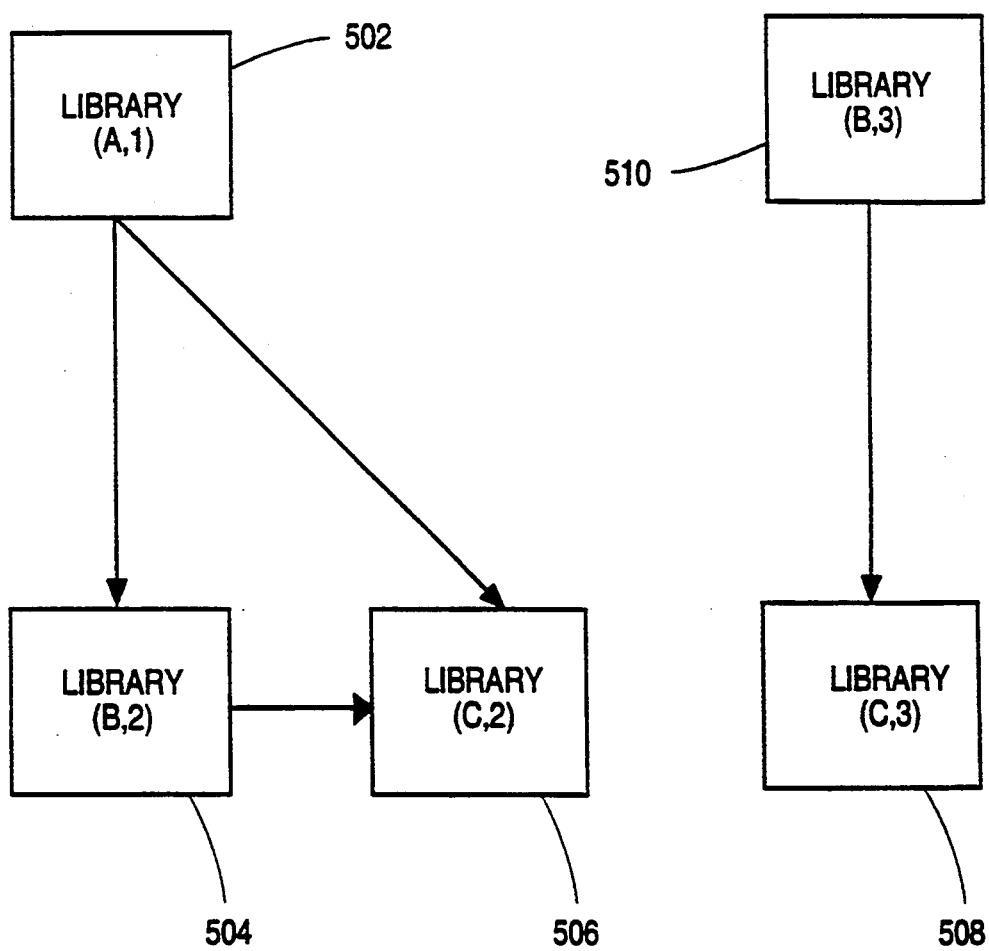
FIG. 5 illustrates an example of shared libraries having varying compatibility numbers, pursuant to an example, in accordance with the present invention.

Referring to FIG. 5, an illustrative example of three libraries with different compatibility numbers is illustrated. Assume three libraries named A, B and C are being loaded. Library A, with compatibility number 1 ("library (A,1)" as indicated by reference numeral 502), depends on library B with compatibility number 2 ("library (B,2)" as indicated by reference numeral 504) and library C with compatibility number 2 ("library (C,2)" as indicated by reference numeral 506). Library B with a compatibility number of 3 ("library (B,3)" as indicated by reference numeral 510) depends on library C with compatibility number 3 ("library (C,3)" as indicated by reference numeral 508). Library (B,2) 504 depends on library (C,2) 506. Library (C,2) 506 and library (C,3) 508 do not, however, depend on any other libraries.

When the loader attempts to load library (A,1) 502, it will also have to load a copy of the libraries which library (A,1) 502 is dependent upon. Loaded copies must possess a compatibility number that is equal to or greater than the compatibility number of the dependent shared library. Accordingly, a loader can load: (i) library (B,2) 504 or library (B,3) 510; and (ii) library (C,2) 506 and library (C,3) 508. Library (B,3) 510 must, however, be loaded with library (C,3) 508. Library (C,2) 506 will not suffice to satisfy the dependency of library (B,3) 510.

A search object, or plurality of search objects, will locate library (A,1) 502, library (B,2) 504, library (B,3) 510, library (C,2) 506, and library (C,3) 508. If a search object returns the copy with the greatest compatibility number, it will return library (A, 1) 502, library (B,3) 510, and library (C,3) 508. These three libraries will then load since all dependencies are fulfilled.

If a search object did not return the aforementioned three libraries, loading may not have been possible. For instance, a search object could return library (A,1) 502, library (B,3) 510, and library (C,2) 506. In such an instance, the libraries would not load because the dependency of library (B,3) 510 upon library (C,3) 508 is not satisfied. In order to avoid this situation, a search object must return the copy of a library with the highest compatibility number. Of course, this can only be accomplished if the search object can access the compatibility number of a shared library.

Team Attributes of Search Objects

Search objects are placed within a team. Each team has a list of one or more search objects which the loader then consults when loading a shared library associated with the team. There is no limit to the number of search objects that can be contained within a team. When a new team is created, a collection of search objects may be passed into a constructor object, as formed within class TTeamHandle (as disclosed within FIG. 3 by reference numeral 308). The collection of search objects is then added to the new team.

Two types of search objects, derived from class TLibrarySearcher 302, exist within a team. First, search objects are added to all teams that are created. These are referred to as "system search objects". Second, search objects can be created that are only added to specified teams. These are referred to as team specific objects. When a team is accessed, both the team specific search objects and the system search objects are streamed into the address space of the team. Hence, TLibrarySearcher 302 subclasses TStandardLibrarySearcher 304 and TWorkspaceSearcher 306, must have streaming operators.

The loader employs the collection of search objects within a team to map library names to library locations or modules. Thereafter, the shared libraries are placed within the address space of the team. The loader preferably employs the search objects in "LIFO order" ("last in, first out"). That is, the search objects are employed in the order with which they were added to the team. Accordingly, the most recently added search object is first employed. Search objects are consecutively employed in LIFO order until a shared library is located. If none of the search objects can locate the shared library, the loader raises an exception since it cannot proceed. In response to the exception, search objects may be added to a team after the team is accessed. However, subsequently added search objects can only locate shared libraries that will be dynamically loaded into the address space of the team after the addition of search objects.

Preferably, the loader employs search objects in LIFO order since it is assumed that the more recently added search objects are intended to override existing search objects. Thus, the collection of team search objects are always employed before any default search object as defined from class TStandardLibrarySearcher 304. For example, there may be two versions of shared library X in the system. A default search object will map library X to a first version of library X. A search object defined by class TWorkspaceSearcher 306 would, however, map to a second version of library X. If the workspace defined search object is employed before the default search object, library X will map to the second version of library X. Accordingly, the correct version of library X will be loaded into the address space of the team since the workspace defined search object is consulted before the system search object.

Alternatively, the same effect is achieved by specifying a temporary team search object. A temporary search object can be specified in a call to "TLibrary::LoadLibrary for library X." The team thus uses the temporary search object for the duration of the call so as to load the proper version of library X. Temporary search objects are especially useful after a team is launched. This is so since temporary search objects do not add to the collection of team search objects. In contrast, the addition of a search object to a team adversely affects the usage of the team with respect to other shared libraries. Thus, a temporary library search object should be utilized when dynamically loading libraries into a running team.

A system search object, which is associated with all teams, is employed by a loader only after all team specific search objects are employed. Thus, search objects are employed in the following order: (i) team specific search objects; (ii) system search objects; and (iii) default search objects. Furthermore, since the present invention employs system objects in LIFO order, an added system search objects only affects the loading of those shared libraries that are created after it was added to the system.

A search object may be added for application with respect to either all teams on a system or a particular team. If a system search object is added for application with respect to all teams (by invoking "TLibrarySearcher::AddSystemSearcher"), the system object will be applied to all subsequently created teams. If, however, a search object is added for application with respect to a team (by the invocation of "TTeamHandle::AddLibrarySearcher"), the newly created search object will be applied only to library searchs by that team.

Preferably, search objects are not permitted to be removed once added to a team. This being so whether the added search object is a team specified search object or a system search object. This restriction follows since a search object is a global resource that is shared by all tasks of a team. Permitting removal of a team search object with respect to one task would adversely affect another task that is dependent upon the search object. For instance, suppose two independent tasks ("task 1" and "task 2") on the same team have the same added search object. In the event that the search object is removed from task 1, task 2 will still assume that the search object is in place. Thus, both tasks should retain an identical list of search objects. Preferably, temporary search objects should be utilized when a search object need only be used with respect to a certain task so as to not require the search object to be added to a team.

The present invention also undertakes an analysis to determine if a search object, that is sought to be added to a team, already exists within the team. If a search object is added to a team where a duplicate of the search objects already resides, the addition of the second copy of the search object will not take place. The duplicate search object already residing within the team is, however, moved to the end of the listing of team library search objects. This follows since search objects at the end of a team's list of search objects are first employed by the team.

The present invention analyzes the search object type to discover duplicate search objects. For instance, the C++ programming language undertakes a comparison through the exercise of an "Is Equal" method. Hence, all TLibrarySearcher 302 subclasses must override the IsEqual method or an equivalent thereof.

A subclass of TLibrarySearcher 302 can be contained within a shared library. However, in order for a loader to find a given shared library, the given library must not contain the TLibrarySearcher 302 subclass necessary to find it. Thus, a TLibrarySearcher 302 subclass must be in a location external to a shared library which must be searched by the TLibrarySearcher 302 subclass. In other words, a shared library which contains a TLibrarySearcher 302 subclass must be in a location place where it can be found without relying on the TLibrarySearcher 302 subclass it contains to locate it.

One way to insure that the loader can find a given shared library, that contains a TLibrarySearcher 302 subclass, is to put the given shared library where a default system search object can locate it. Class TStandardLibrarySearcher 304, which defines the default search object and is associated with every team, can always locate a given shared library. A newly created team can thus rely only on a default system search object until workspace search object, as defined by class TWorkspaceSearcher 306, is added to the team. Whenever a search object is added to a team, the team must load the shared library that contains the search object. This is accomplished by only using system library search objects and team specific search objects, if any, that already have been added to the team.

Preferably, only one copy of a shared library is loaded into the address space of a team. If the loader thus encounters a given shared library more than once when dealing with a single team, it will assume that the currently loaded shared library is correct. Accordingly, the loader will not even employ a search object to locate the duplicate library. If the collection of search objects of a team are modified and "LoadLibrary" is invoked to load a library that is already in the address space of the team, the modified team would return a different version of the library. Thus, the invocation of LoadLibrary will not have the desired effect since the old version of the library will remain in the address space of the team.

Different teams resident on the same workstation may use different copies of the same shared library. Teams which use different copies of the same shared library may not, however, share objects of another team by means of shared memory even though the object class is defined in the shared library. Rather, a given team is limited to the use of those objects associated with the given team. Although teams using different versions of a shared library cannot share objects with one another, teams are permitted to stream objects whose classes are defined in the shared library to each other.

An embodiment of the present invention, developed by the inventor, is provided in the appendix to this application. This is done in order to clarify the detailed logic of the present invention. Critical elements of each portion of the embodiment are also further explained.

TMappable DataContainer*CreateContainerAndFindLibr ary(constTText&libraryName, constCompatibilityNumberdesiredRelease): Search for the library with the specified name; return a TMappableDataContainer for that library. The caller owns the storage for the TMappableDataContainer. If a library searcher finds multiple copies of a shared library, it must decide which copy to return. It should consider which copy(ies) of the library are currently loaded by running teams in its decision. It also should consider the requested compatibility number of the shared library. If the searcher can access the compatibility number a

---

APPENDIX: PREFERRED EMBODIMENT OF THE PRESENT INVENTION

SOURCE CODE:

```
//Class TLibrarySearcher derived from base class MCollectible
class TLibrarySearcher : public MCollectible
        {
        ....
public                          _TLibrarySearcher();
        virtual TMappableDataContainer *CreateContainerAndFindLibrary(
constTText&LibraryName,
constCompatibilityNumber
                                        desiredRelease)
                                        =0;
        virtual Boolean         IsEqual(const MCollectible *) const =0;
        //the following public methods are for use only by the workspace.
        static void
        AddSystemLibrarySearcher(TLibrarySearcher &);
        static TIterator    *CreateSystemLibrarySearcherIterator();
protected:
                                TLibrarySearcher();
                                TLibrarySearcher(const TLibrary
Searcher&);
        TLibrarySearcher& operator=(const TLibrary Searcher &);
        virtual TStream&    operator>>=(TStream& toWhere) const;
        virtual TStream&    operator<<=(TStream& fromWhere);
        }
//Subclass library searcher used by the run time during system boot.
//Not intended for subclassing.
classTStandardLibrarySearcher : public TLibrarySearcher
        {
        ....
public:
        virtual                 _TStandardLibrarySearcher();
                                TStandardLibrarySearcher();
                                TStandardLibrarySearcher(const
                                TStandardLibrarySearcher &);
        virtual TMappableDataContainer *CreateContainerAndFindLibrary(const
                                TText &libraryName, const
                                CompatabilityNumber
desiredRelease);
        virtual Boolean         IsEqual(const TLibrary Searcher *) const;
        TStandardLibrarySearcher & operator=(const TStandardLibrarySearcher
&);
        virtual TStream & operator>>=(TStream& toWhere) const;
        virtual TStream & operator<<=(TStream& fromWhere);
        }
//Excerpt of TTeamHandle. These are the methods of TTeamHandle
//that use TLibrary Searcher
class TTeamHandle : public MCollectible
        {
        ....
                                TTeamHandle(const TTaskProgram
&whatToRun,
                                    const TOrderedCollection & library
                                    Searchers);
        virtual void    AddLibrarySearcher(TLibrarySearcher &);
        virtual TIterator   *CreateLibrarySearcherIterator();
        ....
        }
```

---

COMMENTS ON SOURCE CODE

//Class TLibrarySearcher derived from base class MCollectible
TLibrarySearcher(): Destructor.

shared library (the compatibility number is a property of shared libraries that are files), it should check that the compatibility number of the shared library it is considering returning is greater than or equal to the desired compatibility number. Return NIL, if the library is not found. This method must be overridden by all TLibrarySearcher subclasses.

Boolean IsEqual(constMCollectible*): Return TRUE if the two library searchers are equivalent; return FALSE if otherwise.

The following methods may be called ONLY by the workspace:

static AddSystemLibrarySearcher(const TLibrarySearcher &): Add a library searcher to the global list of library searchers that are automatically inherited by teams at the time they are created. This function only affects teams that are created after it has been called; it has no effect on any existing teams.

static TIterator*CreateSystemLibrarySearcherIterator():
Creates an iterator for the system library searchers. The iterator returns pointers to TLibrarySearcher subclass objects. The caller owns the storage for the iterator. The iterator owns the storage for the TLibrarySearchers it returns. The iterator returns the system library searchers in the order they would be applied. A kIteratorOutOfSync exception is raised if a system library searcher is added by another thread while the current thread is iterating the system library searchers. //Subclass library searcher used by the run time during system boot. //Not intended for subclassing.

TStandardLibrarySearcher(): Constructor. TStandardLibrarySearcher(): Destructor. TMappable DataContainer*CreateContainerAndFindLibrary(constTText &libraryName, const CompatibilityNumberdesiredRelease): Search for the library with the specified name in the "Shared Libraries" folder on disk and return a TMappableDataContainer for that library; return NIL, if the library is not found. This library searcher does not consider the requested compatibility number in its decision. The caller owns the storage for the TMappableDataContainer object.

BooleanIsEqual(constMCollectible*): Return TRUE if the two standard library searchers are equivalent; return FALSE otherwise.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letter Patents is:

1. A method for locating shared libraries in an object-oriented operating system including objects with logic and data for performing particular functions including at least one library searcher object with logic for mapping a plurality of names of shared libraries to an address in a storage where the associated shared library is stored in a computer, comprising the steps of:
   (a) identifying a plurality of names of shared libraries located in said storage of said computer;
   (b) searching for and attaining a plurality of locations corresponding to said names of shared libraries utilizing said logic in said at least one library searcher object; and
   (c) mapping said plurality of names of shared libraries to said plurality of shared libraries located in said storage of said computer.

2. The method as recited in claim 1, wherein a plurality of directories are searched.

3. The method as recited in claim 1, wherein one or more of the plurality of search objects are used in the event of default.

4. The method as recited in claim 1, wherein one or more of the plurality of search objects are placed within a team.

5. The method as recited in claim 4, wherein the search objects placed within the team are consecutively stored in a last in, first out (LIFO) order.

6. The method as recited in claim 5, wherein last in, first out (LIFO) order is based on when each of the search objects is added to the team.

7. The method as recited within claim 1, wherein only one of the plurality of locations is selectively attained for each of the plurality of shared library names.

8. A method for locating shared libraries in a computer linked with a specific library, comprising the steps of:
   (a) forming a plurality of search objects;
   (b) adding the plurality of search objects into a designated location;
   (c) identifying a plurality of shared library names linked with a specific library;
   (d) consecutively employing the plurality of search objects added into the designated location to attain a plurality of locations corresponding to the plurality of shared library names; and
   (e) mapping the plurality of shared library names to the plurality of attained locations.

9. The method as recited within claim 8, wherein one or more of the plurality of search objects summon a procedure existing in a specified location.

10. The method as recited within claim 9, wherein the procedure can be changed.

11. The method as recited within claim 9, including the step of precluding one or more of the plurality of search objects from being streamed into the designated location when a duplicate of the one or more of the plurality of search objects already exists in the designated location.

12. The method as recited within claim 8, wherein one or more of the plurality of search objects is streamed into a plurality of designated locations.

13. The method as recited within claim 8, wherein the plurality of search objects are consecutively employed based on the order in which the plurality of search objects were streamed into the designated location.

14. An apparatus for locating shared libraries in an object-oriented operating system including objects with logic and data for performing particular functions including at least one library searcher object with logic for mapping a plurality of names of shared libraries to the address in a storage where the associated shared library is stored in a computer, comprising:
   (a) an object-oriented operating system;
   (b) a computer controlled by said operating system;
   (c) a storage attached to and trader the control of said computer;
   (d) a plurality of objects, each of said plurality of objects including logic and data for performing particular functions including at least one library searcher object with logic for mapping a plurality of names of shared libraries to an address in said storage;
   (e) means for identifying a plurality of names of shared libraries located in said storage of said computer;

(f) means for searching for and attaining a plurality of locations corresponding to said names of shared libraries utilizing said logic in said at least one library searcher object; and (g) means for mapping said plurality of names of shared libraries to said plurality of shared libraries located in said storage of said computer.

15. The apparatus as recited in claim 14, wherein a plurality of directories are searched.

16. The apparatus as recited in claim 14, wherein one or more of the plurality of search objects are used in the event of default.

17. The apparatus as recited in claim 14, wherein one or more of the plurality of search objects are placed within a team.

18. The apparatus as recited in claim 17, wherein the search objects placed within the team are consecutively employed in a last in, first out (LIFO) order.

19. The apparatus as recited in claim 18, wherein the last in, first out (LIFO) order is based on when each of the search objects is added to the team.

20. The apparatus as recited within claim 14, wherein only one of the plurality of locations is selectively attained for each of the plurality of shared library names.

21. The apparatus as recited within claim 14, wherein the plurality of shared library names linked with the specific library are ascertained by referring to a defined location.

22. An apparatus for locating shared libraries linked with a specific library, comprising:

(a) means for forming a plurality of search objects;

(b) means for adding the plurality of search objects into a designated location;

(c) means for ascertaining a plurality of shared library names linked with a specific library;

(d) means for consecutively employing the plurality of search objects added into the designated location to attain a plurality of locations corresponding to the plurality of shared library names; and (e) means for mapping the plurality of shared library names to the plurality of attained locations.

23. The apparatus as recited within claim 22, including means for streaming the plurality of attained locations into the designated location.

24. The apparatus as recited within claim 22, wherein one or more of the plurality of search objects summon a procedure existing in a specified location.

25. The apparatus as recited within claim 24, wherein the procedure can be changed.

26. The apparatus as recited within claim 25, including a processor for precluding one or more of the plurality of search objects from being streamed into the designated location when a duplicate of the one or more of the plurality of search objects already exists in the designated location.

27. The apparatus as recited within claim 22, wherein one or more of the plurality of search objects is streamed into a plurality of designated locations.

28. The apparatus as recited within claim 22, wherein the plurality of search objects are consecutively employed based on the order in which the plurality of search objects were streamed into the designated location.

* * * * *